United States Patent [19]
Mori

[11] Patent Number: 4,702,546
[45] Date of Patent: Oct. 27, 1987

[54] LIGHT SOURCE DEVICE

[76] Inventor: Kei Mori, 3-16-3-501, Kaminoge, Setagaya-ku, Tokyo, Japan

[21] Appl. No.: 772,824

[22] Filed: Sep. 5, 1985

[30] Foreign Application Priority Data

Sep. 14, 1984 [JP] Japan .................. 59-193076

[51] Int. Cl.⁴ .................. G02B 6/00; G02B 17/00
[52] U.S. Cl. .................. 350/96.1; 350/258; 350/265; 350/267
[58] Field of Search .................. 250/227; 350/96.10, 350/96.15, 96.24, 96.29, 96.30, 258, 259, 260, 261, 262, 263, 264, 265, 267, 276 SL; 362/32

[56] References Cited

U.S. PATENT DOCUMENTS 4,313,650 2/1982 Ward et al. .................. 350/263
4,459,642 7/1984 Mori .................. 350/96.1 X

FOREIGN PATENT DOCUMENTS 0171767 2/1986 European Pat. Off. .................. 350/258
0172500 2/1986 European Pat. Off. .................. 350/258
0012506 1/1985 Japan .................. 350/259

Primary Examiner—Eugene R. LaRoche
Assistant Examiner—Steven J. Mottola
Attorney, Agent, or Firm—Jordan and Hamburg

[57] ABSTRACT

A light source device for effectively diffusing and radiating light rays which have been transmitted through an optical conductor cable or the like, to the outside of the optical conductor cable. The light source device contains a light radiator comprising a transparent cylinder, an optical conductor for guiding light rays into the cylinder through one end of it, optical means movably accommodated in the cylinder for reflecting the light rays guided into the cylinder from the optical conductor and radiating the light rays outside of the cylinder, and driving means for moving the optical means along an axis direction of the cylinder, a large number of the cylinders being arranged crosswise in a state of grille.

10 Claims, 6 Drawing Figures

LIGHT SOURCE DEVICE

BACKGROUND OF THE INVENTION

The present applicant has previously proposed various ways to focus solar rays or artificial light rays by the use of lenses or the like and to guide the same into an optical conductor cable, and thereby to transmit them onto an optional desired place. The solar rays or the artificial light rays transmitted and emitted in such a way are employed for photo-synthesis and for use in illumination or for other like purposes, as for example, to promote the cultivation of plants.

However, in the case of utilizng the light energy for cultivating plants as mentioned above, the light rays transmitted through the optical conductor cable have directional characteristics. Supposing that the end portion of the optical conductor cable is cut off and the light rays are emitted therefrom, the radiation angle for the focused light rays is, in general, equal to approximately 46°. That is quite a narrow field. In the case of utilizing the light energy as described above, it is impossible to perform a desirable amount of illumination by simply cutting off the end portion of the optical conductor cable and by letting the light rays emit therefrom.

Therefore, the present applicant has already proposed various kinds of radiators capable of effectively diffusing the light rays which have been transmitted through an optical conductor cable and for radiating the same for the purpose of illuminating a desired area. The present invention extends the idea and, in particular aims at applying intensified light rays to a desired place and to keep the light source at a distance to plants and to move the light source back and forth in order to supply light rays over a wider area.

SUMMARY OF THE INVENTION

It is an object of the present invention to provide a light radiator capable of effectively emitting solar rays or artificial light rays which were transmitted through an optical conductor cable outside the same for nurturing plants.

It is another object of the present invention to provide a light radiator capable of effectively moving the optical means installed in a transparent cylinder.

It is another object of the present invention to provide a light radiator of which the light energy of good quality and suitable for nurturing the plants can be effectively supplied to the plants.

The above-mentioned features and other advantages of the present invention will be apparent from the following detailed description which goes with the accompanying drawings.

DESCRIPTION OF THE PREFERRED EMBODIMENTS

Figure 1:
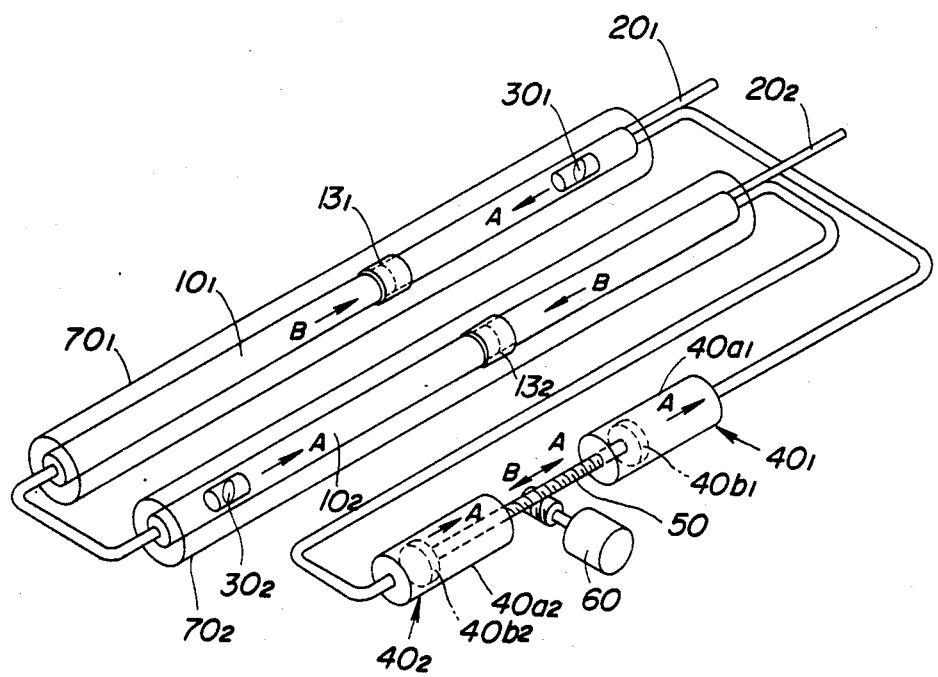
FIG. 1 is a construction view for explaining an embodiment of a light radiator proposed in another way by the present applicant.

FIG. 1 is a perspective construction view for explaining an embodiment of a light radiator proposed in another way by the present applicant. In FIG. 1, $10_1$ and $10_2$ are transparent cylinders, $20_1$ and $20_2$ optical conductors, $30_1$ and $30_2$ optical means, and $40_1$ and $40_2$ liquid pumps. The cylinders $10_1$ and $10_2$ are filled with optical oil. The liquid pumps $40_1$ and $40_2$ consist of, respectively, cylinders $40a_1$, $40a_2$ and pistons $40b_1$, $40b_2$. The pistons $40b_1$, $40b_2$ are connected with each other through a connecting member 50 which can be reciprocally moved in the direction of A and the direction of B by means of a driving means which acts like a motor.

Consequently, when the connecting member 50 is moved in the direction shown by arrow A, optical oil in the liquid pump $40_1$ is pushed out in the direction of A by the piston $40b_1$ and thereby supplied to the cylinder $10_1$. As a result, the optical means $30_1$ in the cylinder $10_1$ moves in the direction of A and, at the same time, the piston $40b_2$ in the liquid pump $40_2$ moves also in the direction of A. In such a manner, the optical oil in the cylinder $10_2$ is sucked up by the liquid pump $40_2$ so that the optical means $30_2$ in the cylinder $10_2$ moves in the direction of A. When the connecting member 50 is moved in a direction shown by arrow B, the liquid pumps $40_1$ and $40_2$ operate in a way that is completely opposite to that mentioned above so that the optical means $30_1$ and $30_2$ move in the direction of B.

Moreover, $70_1$ and $70_2$ are transparent pipes for protecting, respectively, cylinders $10_1$ and $10_2$. Actually, the cylinders $10_1$ and $10_2$ are fine and made of a hard and fragile substance like quartz or the like, while the protective pipes $70_1$ and $70_2$, etc. are constructed of a comparatively strong substance like acrylic, etc. In such a construction, it may be possible to prevent the cylinder $10_1$ or $10_2$ from being injured or destroyed when an object directly hits the cylinder $10_1$ or $10_2$.

Figure 2:
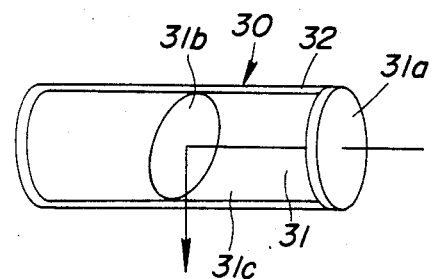
FIG. 2 is a construction view showing an embodiment of the optical means.

FIG. 2 is a cross-sectional view showing an embodiment of the optical means preferably employed in the light radiator as mentioned above. In FIG. 2, 30 is an optical means consisting of a cylindrical optical conductor 31 having one end surface 31a formed on a plane surface and another end surface 31b formed on an inclined plane surface and a cover member 32 for forming an air chamber at the side of the inclined plane surface 31b by closing the side thereof. In relation to the optical means 30, the longer side 31c of the cylinder 31 is always lowered by the action of gravity in the case of employing the cylinders $10_1$ and $10_2$ both of which are set horizontally.

The present invention intend to provide a light source device capable of effectively supplying light rays to plants etc. by utilizing the light radiator as mentioned above. However, the present invention is not limited to the afore-mentioned light radiator. Other various kinds of light radiators, which have been previously proposed by the present applicant, can also be employed according to the present invention.

Figure 3:
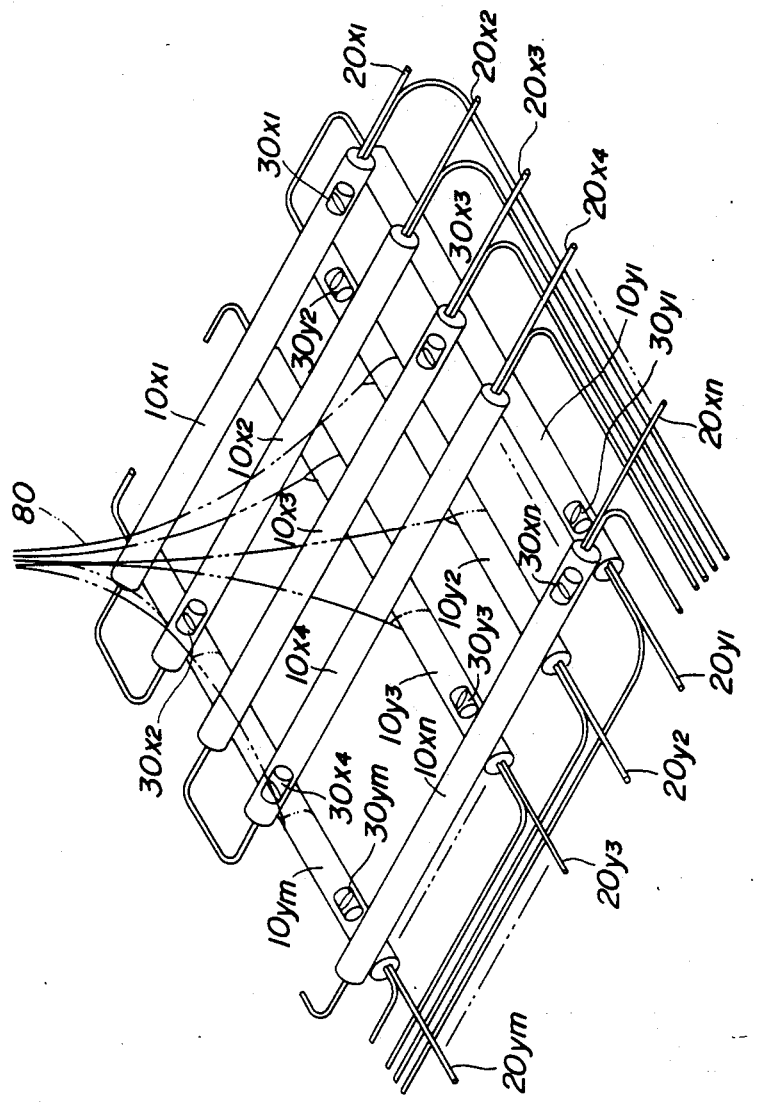
FIG. 3 is a construction view for explaining an embodiment of a light source device according to the present invention.

FIG. 3 is a perspective construction view for explaining an embodiment of a light source device according to the present invention. In FIG. 3, $10x_1, 10x_2, \ldots, 10x_n$ are cylinders arranged in a lateral direction and parallel to each other, $10y_1, 10y_2, \ldots, 10ym$ cylinders are arranged in a longitudinal direction perpendicular thereto and parallel to each other, $20x_1, 20x_2, \ldots, 20xn, 20y_1, 20y_2, \ldots, 20ym$ optical conductors for supplying the light rays into those optical conductors (cylinders), add $30x_1, 30x_2, \ldots, 30xn, 30y_1, 30y_2, \ldots, 30ym$ optical means which are movably arranged inside the respective cylinders.

Those optical means are moved inside the cylinders in such a manner as mentioned before and discharge the light rays downward which have been guided from the optical conductor into the cylinder. The plants to be cultivated are planted under the light radiator and arranged crosswise in parallel fashion as mentioned above. When the plants are small, the light radiator is lowered so as to set the light source near the plants. In such a manner, the plants can be nurtured much more effectively.

In FIG. 3, 80 is a cable for hanging down the aforementioned light radiator. The cable 80 is moved up and down by winding the same forward and backward by use of a drum (not shown in FIG. 3). When the plants are small the light radiator is lowered so as to put the light source at a position near the plants. When the plants grow up the light radiator is wound up for controlling the position of the light source in order to always supply light rays to the plants at a position near them.

Furthermore, the movement area of the optical means can be regulated by controlling the movement area of the movement member 50 shown in FIG. 1. When the plants are small, in other words, the square measure occupied by the plants is small, the movement area of the optical means is decreased. On the contrary, when the plants grow up the movement area thereof is increased. In such a manner, the light energy can be more and more effectively supplied to the plants. Also, the ultraviolet rays, the infrared rays or the like tend to disturb the development of plants. Those ultraviolet rays and infrared rays are not contained in the light rays transmitted through the optical conductor. However, in the case of cultivating the plants indoors by use of the light radiator as mentioned above, it follows that the ultraviolet rays or the infrared rays are supplied to the plants from a light source such as a fluorescent lamp for illuminating the inside of a room or otherwise through a light-receiving window. For this reason, it is necessary to cut out ultraviolet rays and infrared rays.

Figure 4:
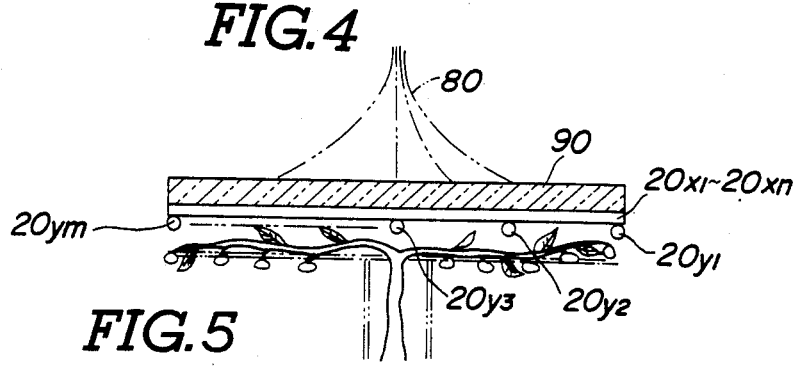
FIG. 4 is a construction view for explaining another embodiment of the present invention.

FIG. 4 is a cross-sectional side view showing an embodiment for cutting out the afore-mentioned harmful ultraviolet and infrared rays. In FIG. 4, 90 is a filter for cutting out ultraviolet and infrared rays. If such a filter 90 is put above the light radiator, as mentioned above, the ultraviolet or infrared rays supplied by means of a fluorescent lamp and a light receiving window are cut off by the filter 90 so that the plants can be more effectively nurtured.

Figure 5:
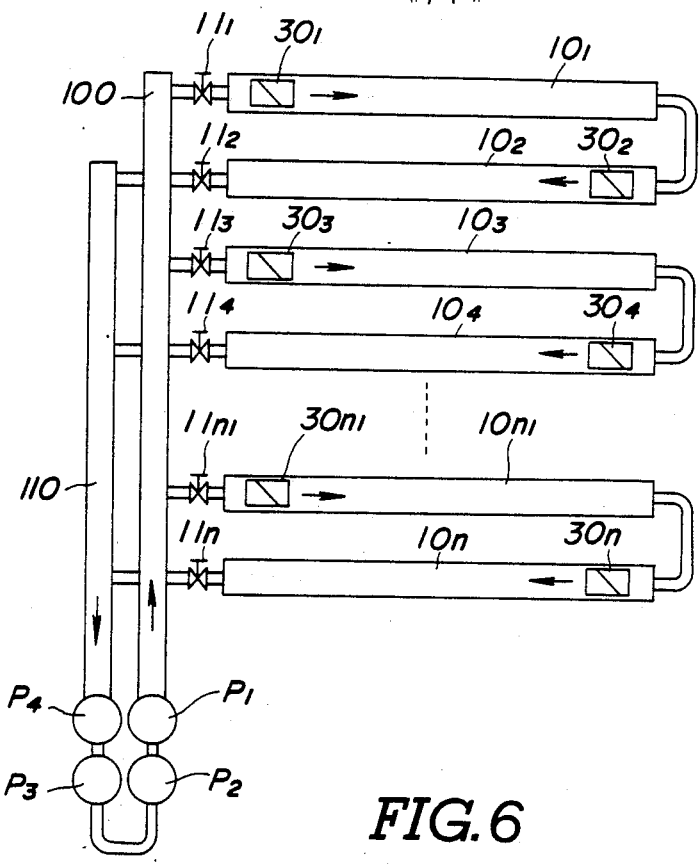
FIG. 5 is a view showing an embodiment of the optical, oil-supplying method for arranging a large number of cylinders parallel to each other.

FIG. 5 is a view showing an embodiment for arranging a large number of cylinders as mentioned above in parallel with each other. In the embodiment shown in FIG. 5, one end portion of the cylinders; $10_1, 10_3, \ldots, 10n_1$ is connected with a common optical, oil-supplying pipe 100, while the other end portion of the cylinders; $10_2, 10_4, \ldots, 10n$ is connected with another common optical, oil-supplying pipe 110. The optical means $30_1$ through $30n$ in all of those cylinders $10_1$ through $10n$ are moved at the same time through the common optical oil supplying pipes 100 and 110.

On that occasion, the amount of optical oil flowing through the optical, oil-supplying pipes 100 and 110, is equal to that of the optical oil flowing through the cylinders $10_1 \sim 10n$. For this reason, when the number of cylinders $10_1 \sim 10n$ becomes large, the amount of optical oil flowing through the optical, oil-supplying pipes 100 and 110 has to be increased.

In FIG. 5, pumps $P_1 \sim P_4$ are provided in order to satisfy the requirements as mentioned above. When the optical oil needs to be moved in a direction shown by the arrows, the pumps $P_1$ and $P_3$ are driven in an operative state while the other pumps $P_2$ and $P_4$ stop the operation thereof. On the contrary, when the optical oil needs to be moved in another direction i.e. opposite to that shown by the arrows, the pumps $P_2$ and $P_4$ are operational while the other pumps $P_1$ and $P_3$ stop working. In such a manner, since each pump is allowed to move in only one direction, it becomes easy to control those pumps so that optical oil can be effectively supplied.

Furthermore, in the case of supplying the optical oil to a large number of cylinders through the common optical, oil-supplying pipes, as mentioned above, the optical oil is not always uniformly supplied to the respective cylinders. Consequently, if the fluid-resisting, value adjusting devices $11_1 \sim 11n$ are installed at the end portions of the respective cylinders $10_1 \sim 10n$, the optical oil can be uniformly supplied to the cylinders $10_1 \sim 10n$ by adjusting the fluid-resistance, value-adjusting devices $11_1 \sim 11n$. Otherwise, the movement area of the respective optical means $30_1 \sim 30n$ can be optionally adjusted by adjusting the amount of optical oil to be supplied to the respective cylinders to a desired value.

Figure 6:
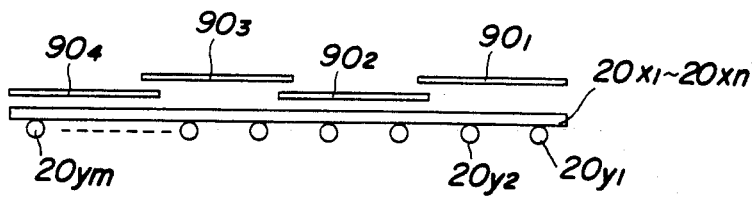
FIG. 6 is a construction view for explaining another embodiment of a light filter.

FIG. 6 is a side view showing another embodiment of the light filter. In FIG. 6, a plurality of light filters $90_1 \sim 90n$ are arranged, for instance, in zigzag fashion for the purpose of providing air passages. By the use of such a construction, the plants under the light radiator can be easily supplied with air. Furthermore such air passages as shown in FIG. 6 represent only one example. It can be easily understood that other various air passages are possible for the purpose.

As is apparent from the foregoing description, according to the present invention, it is possible to provide a light source device in which light energy of good quality which is suitable for nurturing plants can be effectively supplied to plants.

I claim:

1. A light radiator comprising a first plurality of first transparent cylinder means, each of said first transparent cylinder means having a first longitudinal axis, first optical conductor means for guiding light rays into said first transparent cylinder means through one longitudinal end of said first transparent cylinder means, first optical means accommodated in said first transparent cylinder means for reflecting said light rays guided into each first transparent cylinder means from said first optical conductor means and radiating said light rays outside of said first transparent cylinder means, a second plurality of second transparent cylinder means, each of said second transparent cylinder means having a second longitudinal axis, second optical conductor means for guiding light rays into said second transparent cylinder means through one longitudinal end of said second transparent cylinder means, second optical means accommodated in said second transparent cylinder means for reflecting said light rays guided into said second transparent cylinder means from said second optical conductor means and radiating said light rays outside of said second transparent cylinder means, driving means for moving said first optical means along the longitudinal axial direction of said first transparent cylinder means and for moving said second optical means along the longitudinal axial direction of said second transparent cylinder means, said first plurality of first transparent cylinder means having their longitudinal axes disposed parallel to each other and extending in a first direction, said second plurality of second transparent cylinder means having their longitudinal axes disposed parallel to each other and extending in a second direction, said said first direction being transverse to said second direction to thereby provide a criss-cross array of said first and second transparent cylinder means, whereby said criss-cross array is disposed in a position to overlie growing plants such that said criss-cross array provides light energy to the underlying growing plants.

2. A light radiator according to claim 1, wherein the longitudinal axes of said first plurality of transparent cylinder means are disposed in a first horizontal plane and the longitudinal axes of said second plurality of transparent cylinder means are disposed in a second horizontal plane which underlies said first horizontal plane.

3. A light radiator according to claim 1, wherein said first direction is perpendicular to said second direction.

4. A light radiator according to claim 1, wherein said driving means comprises a plurality of first fluid pipe means connected to some of said first transparent cylinder means and a plurality of second fluid pipe means connected to other of said first transparent cylinder means, a first single common pipe means connected to each of said first fluid pipe means, a second single common pipe means connected to each of said second fluid pipe means, said driving means further comprising pump means for pumping fluid in each of said first and second common pipe means.

5. A light radiator according to claim 4, wherein said pump means comprises a first and second pump connected to said first common pipe means and a third and fourth pump connected to said second common pipe means such that in one operable mode, said first pump supplies fluid to said first common pipe means, said third pump draws in fluid into said second common pipe means, and said second and third pump are idle, and in another operable mode, said second pump draws in fluid into said first common pipe means, said fourth pump supplies fluid to said second common pipe means, and said first and third pumps are idle.

6. A light radiator according to claim 1, wherein said first and second optical means reflect said light rays downwardly to said underlying growing plants.

7. A light radiator according to claim 1 further comprising raising and lowering means connected to said criss-cross array for raising and lowering the criss-cross array depending on the size of the underlying growing plants.

8. A light radiator according to claim 1 further comprising light filter means overlying said criss-cross array.

9. A light radiator according to claim 8, wherein said filter means comprises a plurality of spaced light filter elements such that air can pass between said spaced filter elements.

10. A light radiator comprising a first plurality of first transparent cylinder means, each of said first transparent cylinder means having a first horizontally disposed longitudinal axis, first optical conductor means for guiding light rays into said first transparent cylinder means through one longitudinal end of said first transparent cylinder means, first optical means accommodated in said first transparent cylinder means for reflecting said light rays guided into each first transparent cylinder means from said first optical conductor means and radiating said light rays outside and downwardly of said first transparent cylinder means, a second plurality of second transparent cylinder means, each of said second transparent cylinder means having a second horizontally disposed longitudinal axis, second optical conductor means for guiding light rays into said second transparent cylinder means through one longitudinal end of said second transparent cylinder means, second optical means accommodated in said second transparent cylinder means for reflecting said light rays guided into said second transparent cylinder means from said second optical conductor means and radiating said light rays outside and downwardly of said second transparent cylinder means, the longitudinal axes of said first plurality of transparent cylinder means being disposed in a first horizontal plane and the longitudinal axes of said second plurality of transparent cylinder means being disposed in a second horizontal plane which underlies said first horizontal plane, driving means for moving said first optical means along the longitudinal axial direction of said first transparent cylinder means and for moving said second optical means along the longitudinal axial direction of said second transparent cylinder means, said first plurality of first transparent cylinder means having their longitudinal axes disposed parallel to each other and extending in a first direction, said second plurality of second transparent cylinder means having their longitudinal axes disposed parallel to each other and extending in a second direction which is perpendicular to said first direction to thereby provide a criss-cross array of said first and second transparent cylinder means, whereby said criss-cross array is disposed in a position to overlie growing plants such that said criss-cross array provides light energy to the underlying growing plants, and raising and lowering means connected to said criss-cross array for raising and lowering the criss-cross array depending on the size of the underlying growing plants.

* * * * *